United States Patent [19]
Merriweather

[11] 3,867,568
[45] Feb. 18, 1975

[54] CONTROL CIRCUIT FOR AN AFC SYSTEM

[75] Inventor: Kenneth A. Merriweather, Evanston, Ill.

[73] Assignee: Warwick Electronics Inc., Chicago, Ill.

[22] Filed: Dec. 4, 1972

[21] Appl. No.: 312,082

[52] U.S. Cl. .......... 178/5.8 AF, 178/7.3 R, 325/418
[51] Int. Cl. .......... H04n 5/50
[58] Field of Search .......... 325/346, 418–423, 325/470; 178/7.3 R, 7.5 R, 5.8 AF, 5.8 R, DIG. 15; 334/15, 16

[56] References Cited

UNITED STATES PATENTS

| | | | |
|---|---|---|---|
| 2,172,456 | 9/1939 | Schock | 325/422 |
| 2,790,848 | 4/1957 | Koch | 178/5.8 AF |
| 2,891,105 | 6/1959 | Keizer | 178/5.8 AF |
| 2,896,018 | 7/1959 | Rhodes et al. | 178/5.8 AF |
| 2,898,400 | 8/1959 | Parmet et al. | 325/470 |
| 2,916,545 | 12/1959 | Baugh, Jr. | 178/5.8 R |
| 3,619,492 | 11/1971 | Evans | 178/5.8 R |
| 3,631,349 | 12/1971 | Rhee | 325/422 |

OTHER PUBLICATIONS

"Automatic Freq. Control," by Lavender, in the RCA Technical Notes, No. 348, Nov., 1959.

*Primary Examiner*—Benedict V. Safourek
*Assistant Examiner*—Jin F. Ng
*Attorney, Agent, or Firm*—Wegner, Stellman, McCord, Wiles & Wood

[57] ABSTRACT

A television receiver includes varactor tuners controlled by a tuning voltage from an electronic touch tuning circuit. An automatic frequency control (AFC) voltage, developed from the IF output of an IF amplifier, is superimposed on the tuning voltage to lock the tuner to a desired UHF or VHF station. An AFC defeat circuit is responsive to the absence of a plurality of sync pulses from a sync separator to terminate the AFC voltage. For noise immunity, the AFC defeat circuit is enabled by retrace pulses from a horizontal scan stage.

11 Claims, 2 Drawing Figures

CONTROL CIRCUIT FOR AN AFC SYSTEM

BACKGROUND OF THE INVENTION

Many receivers are provided with an AFC circuit for locking a local oscillator so that the intermediate frequency (IF) output from an IF amplifier stage remains centered on a desired IF frequency. When no station or channel is being received, an AFC circuit often develops a voltage which varies considerably from its predetermined reference voltage, thereby moving it outside of its effective pull-in range. When the receiver is later switched to a desired station the AFC circuit may fail to lock onto the desired station but rather may lock onto the co-channel sound carrier, or the carrier of an adjacent station. In a television receiver having a UHF tuner which is mechanically or electrically detented to preselected UHF stations this problem is especially critical since the difficulty of accurately detenting a UHF tuner requires that the AFC circuit have an extended pull-in range. Where such a wide pull-in range is required, the AFC circuit is much more prone to lock onto an adjacent carrier when a composite television signal is subsequently received. The problem is also frequently experienced if a receiver in which the AFC circuit has drifted outside its range in the VHF band is later switched to the UHF band since the sensitivity of the UHF local oscillator to AFC voltage may be up to four greater than that of the VHF local oscillator.

In television receivers using mechanical type detented tuners this problem is partially alleviated by an AFC defeat switch which is activated during the time that the channel selector knob is being mechanically adjusted to receive a different channel. However, the AFC defeat switch has no effect when the tuner is at a detented channel position, and if no input signal is present (as when the tuner is tuned to an unused channel) the AFC circuit may still drift out of its effective range.

In television receivers using varactor type tuners channel switching may be electronically accomplished by circuitry which provides different preselected voltages to the tuner. With such all-electronic tuners, no mechanical switching occurs when changing from one channel to another. Thus, it is not convenient to provide a mechanical AFC defeat switch, further compounding the problem of possible AFC lockout.

SUMMARY OF THE INVENTION

In accordance with the present invention, the problems noted above have been overcome by electronically modifying the operation of the AFC circuit, as by defeating its operation, in response to a detected absence of an input signal. As a result, the AFC circuit will not drift out of its effective range in an attempt to lock onto noise or other spurious frequency signals within the bandpass of the tuner. The AFC defeat circuit is effective during the time period of channel switching, and in addition is effective when the receiver is switched to an unused channel. The resulting operation is superior to mechanical AFC defeat switches and thus may entirely eliminate such switches in receivers which use a mechanical tuner. Furthermore, the circuit is equally adaptable to varactor tuners in which no mechanical switching occurs during channel changes.

A detector circuit is coupled to the sync separator, or to any other circuitry which can provide sampled pulses representative of the presence of a received signal. In response to the absence of a predetermined plurality of sync pulses, the detector circuit deactivates or otherwise modifies the operation of the AFC circuit. Noise immunity is provided by disabling the detector circuit except during the limited time period during which sync pulses should be received.

The detector circuit is usable with a variety of receivers in which the operation of an AFC circuit is to be controlled in response to the detected absence of a received input signal. By way of example, the detector circuit could be used in conjuction with other appropriate circuitry to extend the pull-in range of the AFC circuit in a television receiver when no sync pulses are received and the co-channel sound carrier is located in the lower IF bandpass. Such a circuit is disclosed in a copending application of the applicant and Harold J. Benzuly, Ser. No. 312,081, entitled "Extended Range AFC," filed on even date with this application and assigned to the same assignee.

One object of the present invention is the provision of a receiver with an AFC control circuit which modifies the operation of an AFC circuit in response to the detected absence of an input signal.

Another object of the present invention is the provision of a detector for determining the absence of a received television signal and, in response thereto, for switching a bistable stage to an opposite state which defeats the operation of an AFC circuit.

Other objects and advantages of the invention will be apparent from the following descripton, and from the drawings. While an illustrated embodiment of the invention is shown in the drawings and will be described in detail herein, the invention is susceptible of embodiment in several different forms and the present disclosure is to be considered as an exemplification of the principles of the invention and is not intended to limit the invention to the disclosed embodiment.

DESCRIPTION OF THE PREFERRED EMBODIMENT

Figure 1:
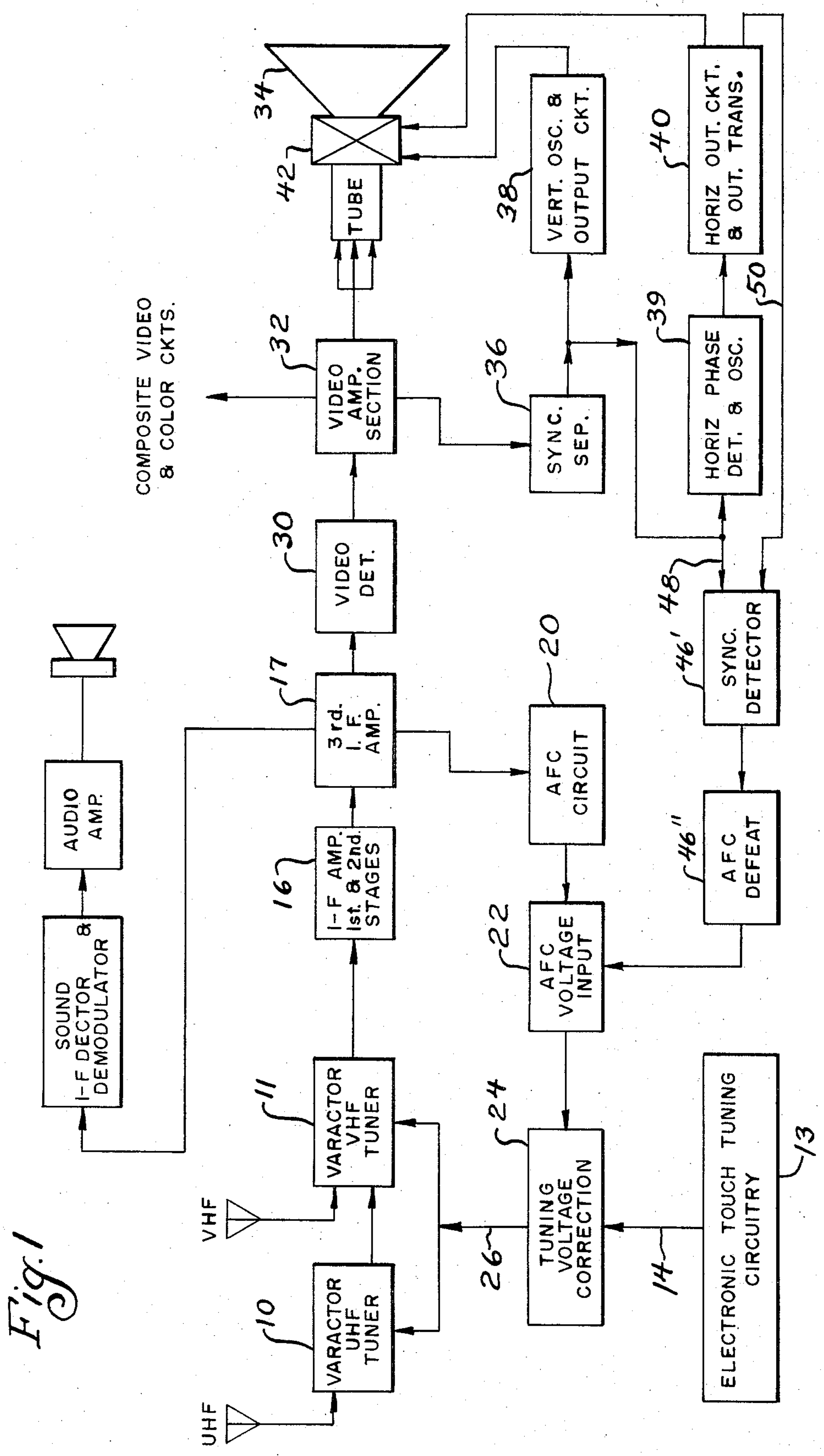
FIG. 1 is a block diagram of a television receiver which includes an electronic AFC defeat circuit constructed in accordance with the present invention.

Referring to FIG. 1, a television receiver is illustrated which uses a varactor UHF tuner 10 and a varactor VHF tuner 11. To change channels, an electronic touch-tuning circuit 13 provides on a line 14 a selected one of a plurality of selectable fixed voltages which represent different UHF and VHF channels. By way of example, the touch-tuning circuit 13 may comprise an 18-stage neon memory circuit in which each stage is activated by an associated touch-tuning plate. VHF channels 2–13 as well as six UHF channels can be assigned to individual touch-tuning plates. When a given touch-tuning plate is contacted by a viewer's finger, an associated memory stage is activated, allowing a preselected tuning voltage to appear on line 14. One example of such a neon memory circuit is shown in co-pending patent application Ser. No. 189,637, filed Oct. 15, 1971, now U.S. Pat. No. 3,746,886 entitled "Memory Circuit," by John G. Konopka, and assigned to the same assignee as the present application.

The tuning voltages appropriately bias varactor diodes within either tuner 10 or 11. The output of the tuners is coupled to an IF amplifier having first and second stages 16 and a third stage 17. When either tuner is properly locked onto a desired composite television signal, the IF frequency of the video carrier is at a desired IF value such as 45.75 megahertz. A conventional AFC circuit 20 is coupled to the third IF stage 17, and samples the IF signal in order to develop an AFC correction voltage having a DC level which varies in value depending on whether the video carrier is above or below the desired frequency of 45.75 megahertz. The AFC correction voltage is coupled through an AFC voltage input circuit 22, to be described, to a tuning voltage correction stage 24 which combines the AFC voltage with the tuning voltage on line 14. The combined tuning and correction voltage is then applied via an output line 26 to the VHF and UHF tuners 10 and 11. The AFC component of the combined voltage causes the local oscillator frequency of the tuner then operative to move in a desired direction such that the IF video carrier frequency will move toward the desired value of 45.75 megahertz.

The video modulating signal, detected by a video detector 30, is amplified in a video amplifier stage 32 before being coupled to a television picture tube 34. A sync separator 36 is coupled to the video amplifier stage 32 and separates the sync pulses from the composite video signal for control of a vertical oscillator and output circuit 38 and a horizontal phase detector and oscillator 39. The output of the horizontal phase detector and oscillator 39 is coupled to a horizontal output circuit and output transformer 40 which provides horizontal scan signals to a deflection coil 42 for the picture tube 34.

In order to defeat or otherwise modify the operation of the AFC circuitry when no input signal is present in the IF bandpass, a sync detector 46' and an AFC defeat circuit 46'' deactivate the AFC voltage input stage 22 in response to the detected absence of a plurality of sync pulses, which disappear when no composite signal is being received. The horizontal sync pulses are coupled to sync detector 46' by an input line 48 from the sync separator 36. For noise immunity, stage 46' is rendered effective only when sync pulses should be present on line 48, namely, during the time when horizontal retrace pulses are developed by the receiver. For this purpose, a line 50 from the horizontal output transformer couples retrace pulses to the sync detector 46'.

Figure 2:
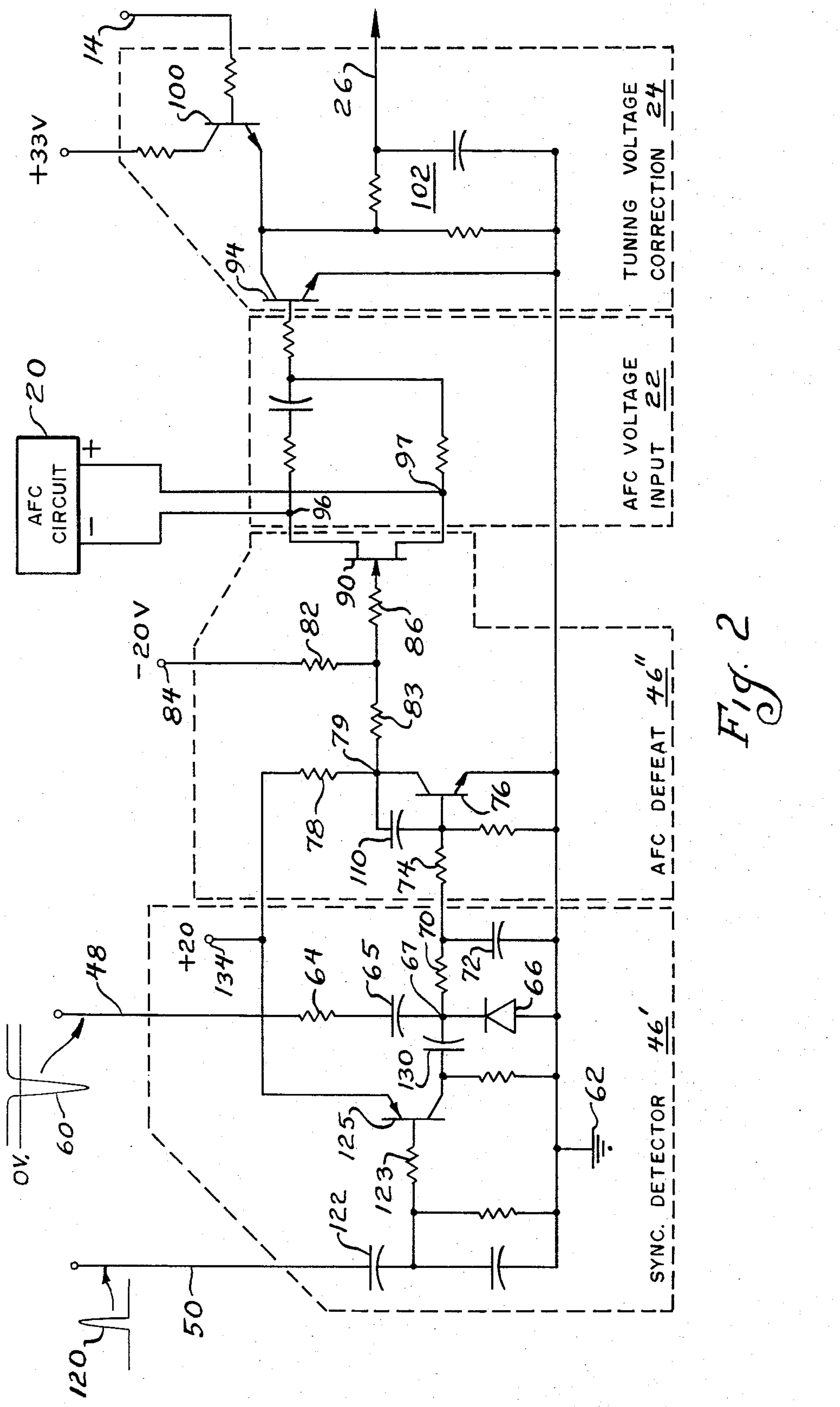
FIG. 2 is a schematic diagram illustrating in detail the circuitry of the sync detector stage, the AFC defeat stage, the AFC voltage input stage and the tuning voltage correction stage, all of which are shown in block diagram form in FIG. 1.

In FIG. 2, the invention is disclosed in detail. On sync input line 48, negative going sync pulses 60 appear which have a peak negative level of approximately −15 volts with respect to a reference level or ground 62 which corresponds to 0 volts DC potential. When sync pulses 60 are not present, line 48 has a slight positive voltage with respect to ground 62. As a negative sync pulse appears, it is coupled to ground 62 through the series combination of a resistor 64, a capacitor 65, and a diode 66.

The current flow through capacitor 65 causes it to charge relatively positive on the plate coupled with junction 67. When the sync pulse 60 disappears and the line 48 goes to a slight positive voltage, the charged capacitor 65 discharges through an RC network including a resistor 70 and a capacitor 72, selected to have a time constant which produces an average voltage, of approximately +8.0 volts at the junction of resistor 70 and capacitor 72 when sync pulses 60 are present during each horizontal scan line.

The resulting +8.0 DC voltage is coupled through a resistor 74 and forward biases and NPN transistor 76 forming a part of the AFC defeat stage 46''. Transistor 76 is driven conductive, producing a voltage drop across its collector load resistor 78 such that a junction point 79 is maintained near the potential of ground 62. A pair of voltage divider resistors 82 and 83 are coupled in series between the terminate 84 of a negative potential source, such as −20 volts, and junction 79. So long as the receiver is tuned to an active channel, the sync pulses maintain transistor 76 forward biased, causing the junction between resistors 82 and 83 to be negative. This negative voltage is coupled through a resistor 86 to the gate of a field effect transistor (FET) 90, maintaining it in its nonconductive state.

When FET 90 is nonconductive, the positive (+) and negative (−) voltages from the AFC circuit 20 are coupled to the base of a transistor 94 in the tuning voltage correction stage 24. The amount of conduction of the transistor 94 depends on the AFC bias signals applied between junctions 96 and 97. A transistor 100 has its base biased by fixed DC level tuning voltage from the touch-tuning circuitry. The current flow through transistor 100 is effected by the conduction level of transistor 94, thus superimposing the main tuning voltage on the correction voltage. Tuning output voltage on the line 26 is provided by a filter network 102 coupled to the direct connection between the emitter of transistor 100 and the collector of transistor 94.

When the receiver channel is switched or the receiver is operated on an unused channel, sync pulses 60 are no longer applied via line 48 to the sync detector 46'. The RC circuit coupled to junction 67 is selected to produce a time constant of about 39 milliseconds, which corresponds to approximately one horizontal frame period. Thus the absence of sync pulses for one-frame period dissipates the forward bias stored in capacitor 72 sufficiently that transistor 76 ceases to conduct. Since transistor 76 is no longer conducting, the junction 79 is unclamped from ground potential and goes relatively positive. This allows the junction of resistors 82 and 83 to go positive, applying a gating signal to the gate of FET 90. The FET now saturates and effectively places a short circuit or shunt across the AFC input lines. Thus, no AFC voltage is passed to the tuning voltage correction stage 24. The overall result is to electronically defeat the AFC circuit 20 during channel changes and during a period when the tuner is tuned to an unused channel.

Various additions can be made to improve circuit operation, if desired. A manually operated AFC on/off switch may be connected directly across junctions 96 and 97. When the switch is closed by a viewer so as to short junctions 96 and 97, the AFC circuit is defeated in the same manner as when FET 90 is driven into its saturated state. To prevent hunting during weak signal conditions, a capacitor 110 may be coupled between junction 79 in AFC defeat section 46'' and the base of transistor 76. For temperature stability, transistors 94 and 100 in tuning voltage corrections stage 24 may be placed in thermal contact. An increase in temperature within one of these devices will then be radiated to the other in order to maintain both transistors at essentially the same temperature. This may be accomplished by captivating both transistors by a common metal band.

For noise immunity, sync detector 46' is rendered effective only during the time period when sync pulses should be present, namely, during the occurrence of horizontal retrace pulses. Positive going retrace pulses 120 are coupled via line 50 and through a capacitor 122 and a resistor 123 to the base of a PNP transistor 125. The transistor 125 is saturated during the scan interval, thereby connecting junction 67 to AC ground via a capacitor 130, the conducting collector-emitter electrodes of transistor 125, and through a B+ terminal 134 and a +20 volt DC supply to ground. Thus, any noise spikes coupled over the sync input line 48 during the horizontal scan interval are filtered by capacitor 130 and the saturated transistor 125.

The AC noise filtering effect must be defeated during the horizontal sync interval to prevent the sync pulses 60 from being bypassed to AC ground. This is accomplished by causing the positive going horizontal retrace pulses 120 to drive transistor 125 into its nonconducting state. Since each sync pulse 60 and each retrace pulse 120 occur at the same time interval, the control voltage applied via the RC circuit to the base of the AFC defeat transistor 76 is developed only during the sync pulse interval.

By way of example, certain of the components described above may have the following representative component values. It should be understood that the following values are only representative and are given in order to disclose a complete, operative embodiment of the invention.

| COMPONENT | VALUE |
|---|---|
| R 64 | 10 K |
| C 65 | 100 pFd |
| R 70 | 100 K |
| C 72 | .02 mFd |
| R 74 | 390 K |
| R 78 | 56 K |
| R 82 | 820 K |
| R 83 | 270 K |
| R 86 | 5.6 Meg. |
| C 110 | .01 mFd |
| C 122 | .005 mFd |
| R 123 | 39 K |
| C 130 | .05 mFd |

While the AFC defeat circuit has been illustrated in a television receiver, it will be apparent that the circuit is equally usable in any receiver which incorporates an AFC stage for retuning a local oscillator, the operation of which should be modified in the absence of a received input signal. Other changes and modifications will be apparent to those skilled in the art.

I claim:

1. In a receiver having tuner means for selecting a carrier signal having a recurring sync pulse and an information portion located between adjacent sync pulses, said carrier signal being located within a predetermined frequency passband, and an AFC circuit for varying the tuning of said tuner means to cause the receiver to lock onto the carrier signal, a control circuit comprising:

sync separator means for detecting said recurring sync pulse, detector means coupled to said sync separator means for detecting the absence of a sync pulse within said passband, and AFC defeat means coupled to said detector means for effectively disabling said AFC circuit in response to the detected absence of the sync pulse.

2. The control circuit of claim 1 wherein the detector means includes time constant means responsive to the absence of a plurality of the sync pulses for producing a control signal, said AFC defeat means being responsive to said control signal to effectively disable said AFC circuit.

3. The control circuit of claim 2 wherein said detector means includes noise gate means for rendering said detector means inoperative except during the time period of a gating pulse, said receiver includes means for generating a periodic signal which occurs in synchronism with said sync pulse, and means coupling said periodic signal to said noise gate means whereby said periodic signal corresponds to said gating pulse.

4. The control circuit of claim 1 wherein said receiver includes tuning voltage means for establishing different tuning voltages representative of different frequency carrier signals to be received, said AFC circuit generates an AFC voltage which alters the frequency passband of said tuner means, combining means coupled to said tuning voltage means and said AFC circuit for combining said tuning voltage and AFC voltage to control the frequency passband of said tuner means, and said AFC defeat means disables said AFC circuit.

5. The control circuit of claim 4 wherein said AFC defeat means includes switch means controllable between a first state which allows said AFC voltage to be coupled to said combining means and a second state which prevents said AFC voltage from being coupled to said combining means, means biasing said switch means into said first state, said AFC defeat means causing said switch means to change to said second state in order to defeat the operation of said AFC circuit.

6. In a television receiver having tuner means for tuning a composite television signal, AFC means for varying the tuning of said tuner means to cause the receiver to lock onto said composite television signal, image reproducing means coupled to said tuner means for demodulating the composite television signal and reproducing an image therefrom, a control circuit comprising:

switchable means having a first state and a second state and coupled to said AFC means for altering the operation thereof in response to said second state, sampling means coupled to said tuner means for sampling a recurring selected portion of the composite television signal, detector means for generating a control signal in response to a detected absence of a plurality of sampled recurring selected portions of the composite television signal, and gate means responsive to said control signal for switching said switchable means to said second state.

7. The control circuit of claim 6 wherein said sampling means comprises sync detector means for detecting sync pulses which correspond to said recurring selected portion of the composite television signal, said television receiver includes scanning means for generating a retrace pulse during the time period of a sync pulse, and noise immunity means for rendering said sync detector means effective only during the occurrence of said retrace pulses.

8. The control circuit of claim 6 wherein said detector means comprises capacitor means, charge means for charging said capacitor means with the sampled recurring selected portions of the composite television signal, level means responsive to a predetermined voltage level across said capacitor means for generating said control signal, discharge means coupled to said capacitor means for discharging said capacitor means, said discharge means having a time constant greater than the sampling period.

9. The control circuit of claim 6 wherein said switchable means comprises AFC defeat means having a first state which allows continued operation of the AFC means and a second state which disables said AFC means.

10. The control circuit of claim 9 wherein said sampling means comprises sync separator means coupled to said tuner means for separating sync pulses from the composite television signal, scanning means for producing a raster synchronized with the occurrence of sync pulses from said sync separator means, said detector means being coupled to said sync separator means for generating said control signal in response to the absence of a plurality of sync pulses from said sync separator means.

11. The control circuit of claim 10 wherein said scanning means includes horizontal output means which generate retrace pulses, noise immunity means for normally disabling said detector means, and means responsive to the retrace pulses from said horizontal output means for enabling said detector means.

* * * * *